Patented Jan. 10, 1928.

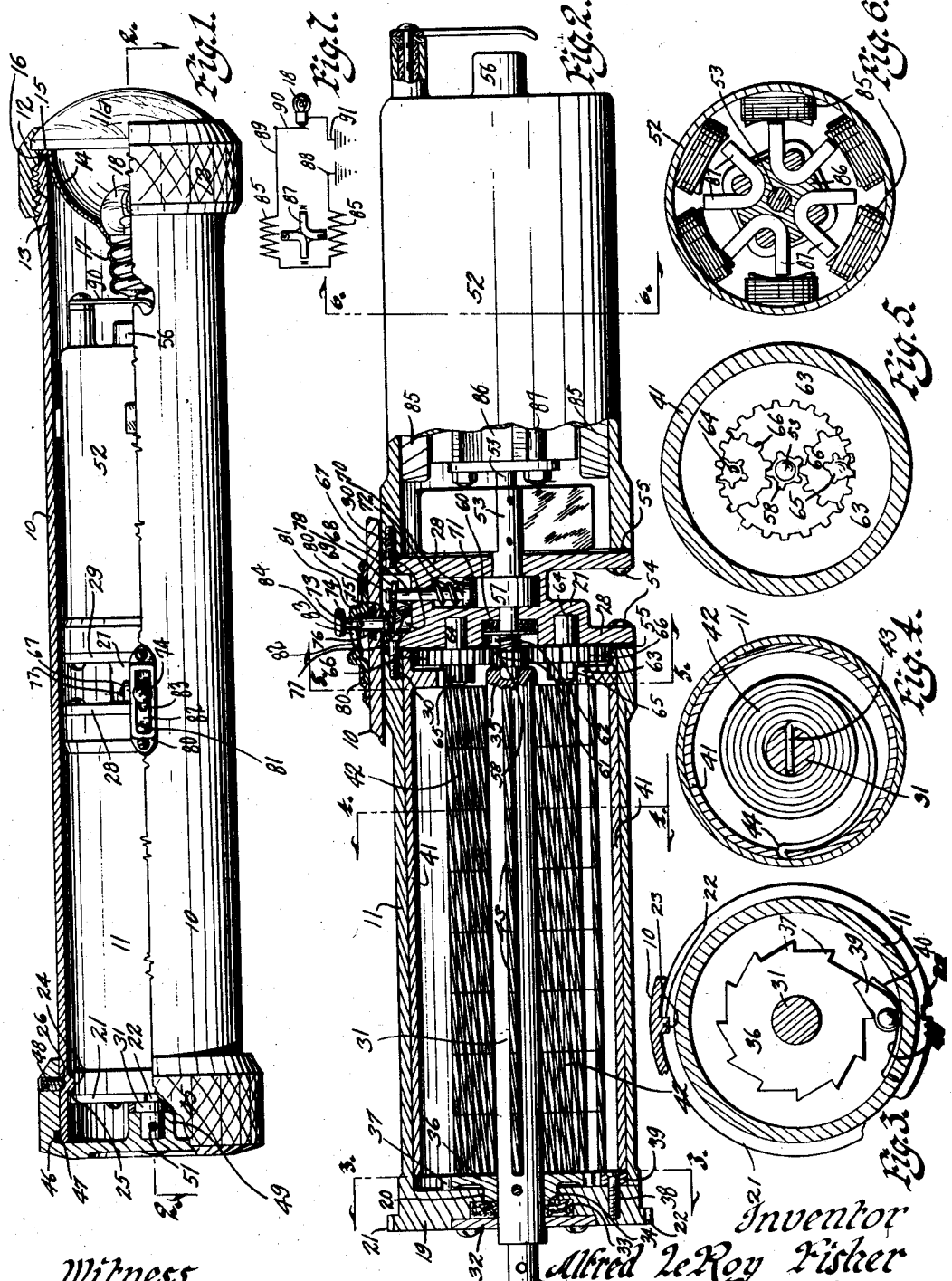

1,655,601

UNITED STATES PATENT OFFICE.

ALFRED LEROY FISHER, OF YALE, IOWA.

SPRING-DRIVEN-GENERATOR ELECTRIC LAMP.

Application filed May 18, 1925. Serial No. 31,061.

The object of my invention is to provide a spring driven generator electric lamp of simple, durable and inexpensive construction.

More particularly, it is my object to provide such an electric lamp, which can be made in the form of a flash-light or other lamp or light device, such as a camp light or the like, having a generator of simple construction and a simple and inexpensive spring motor with novel and simple means for operatively connecting them.

With these and other objects in view, my invention consists in the construction, arrangement and combination of the various parts of my electric lamp, whereby the objects contemplated are attained, as hereinafter more fully set forth, pointed out in my claims, and illustrated in the accompanying drawings, in which:

Figure 1 is a side elevation of a spring driven generator electric lamp embodying my invention, parts being shown in section.

Figure 2 is a side elevation of the interior mechanism of the lamp, parts being omitted and parts broken away and parts being shown in section, taken on the line 2—2 of Figure 1.

Figure 3 is a detailed, sectional view taken on the line 3—3 of Figure 2.

Figure 4 is a similar view taken on the line 4—4 of Figure 2.

Figure 5 is a detailed, sectional view taken on the line 5—5 of Figure 2.

Figure 6 is a similar view taken on the line 6—6 of Figure 2; and

Figure 7 is a diagram of the electric connections of the generator for the lamp.

I have shown my device in the accompanying drawings in the form of a flash-light, although I do not wish to limit myself to that form of embodiment of the invention.

In the drawings herewith, I have used the reference numeral 10 to indicate generally a cylindrical casing. At one end of the casing is a transparent lens 11$^a$ received in one end of a tubular sleeve 12 and preferably cemented therein. The tubular sleeve 12 and the casing 10 have coacting screw-threads 13 for forming a tight joint between them.

A reflector 14 has a flange 15 which is held between the lens 11$^a$ and the end of the case 10 against a suitable gasket 16. The reflector 14 has a screw-threaded extension 17 which receives a suitable electric light bulb 18.

On the inside of the casing 10 is a second case 11 extending less than half way of the case 10 as shown in Figure 1. The case 10 has the closed end 19 provided with a central opening 20. The closed end 19 has an annular peripheral flange 21, which is provided with notches 22 to receive inwardly projecting lugs 23 on the case 10, which holds the case 11 against rotation.

The case 10 has an inwardly projecting annular rib 24 against which the flange 21 abuts. The gasket 25 is arranged between the flange 21 and the rib 24.

On the outside of the case 10 opposite the rib 24 is an annular groove 26.

The inside case 11 is originally open at its forward end, but in the assembled device is closed in the following manner:

At the front end of the case 11 is a hub 27 having at its ends annular flanges 28 and 29. The flange 28 is secured to the front end of the case 11 by means of screws or the like 30. In the case 11 is mounted the spring motor, which will now be described.

*Spring motor.*

A shaft 31 is journaled in a cover plate 32 for the opening 20 at the rear end of the case 11.

A suitable gasket 33 is provided between the cover plate 32 and the shoulder 34. (See Figure 2).

The reasons for supplying the gaskets mentioned herein is to make the device water-tight and also to permit the spring motor to operate in suitable lubricant.

The shaft 31 projects forwardly to the front end of the case 11 and has on its forward end a socket 35. On the shaft 31 near the rear end thereof within the casing 11 is fixed an annular disc 36 provided with ratchet teeth 37 and forming a ratchet.

Pivoted to the end 19 of the case 11 by means of a screw bolt 38 is a pawl 39, which is yieldingly held in contact with the ratchet by means of a spring 40 for preventing rotation of the shaft 31 in one direction.

Within the case 11 is a cylindrical tube 41 forming a spring casing.

A series of convolute springs 42 is mounted in the spring casing 41, each having one end received in a slot 43 in the shaft 31, as shown in Figures 2 and 4, and the other end projected into a slot 44 in the wall of the spring casing 41.

On the rear end of the case 10 is a suitable cap 45 having a gasket groove 46 on its interior to receive the gasket 47 on the outside of the case 10. Set screws 48 are mounted in the wall of the cap 45, as shown in Figure 1 and are designated to be screwed into the groove 26 far enough to prevent the removal of the cap 45, but not far enough to lock it against rotation.

On the interior of the cap 45 is a socket 49 receiving a reduced end 50 of the shaft 31 and secured thereto by a pin 51.

It will be seen that by rotating the cap 45, the springs 42 may be wound up for tensioning.

The means for holding the springs against unwinding comprises the ratchet and pawl already described and another device which will be hereinafter described.

In the forward part of the casing 10 is a casing 52, which is the generator casing. Arranged in this casing is a generator shaft 53. The rear end of the casing 52 is formed by the flange 29, which is secured to the casing 52 by means of screw bolts 54. A gasket 55 is provided between the flange 29 and the casing 52. The front end of the casing 52 is provided with a bearing 56 for the forward end of the generator shaft 53.

The generator shaft 53 extends rearwardly through the hub 27 and has a reduced portion which fits into the socket 35 in the shaft 31. On the shaft 53 in the hub 27 is formed a disc or the like 57. On the shaft 53 near the rear end thereof is a pinion 58.

Between the pinion 58 and the hub 27, I provide packing 60 adjacent to which is a washer 61. Between the washer 61 and the pinion 58 is a spring 62 for holding the washer against the packing.

Formed on the front end of the casing 41 is an internal gear 63. Journaled in the flange 28 diametrically opposite each other are spindles 64 on which are pinions 65, which mesh with the gear 63. On the spindles 64 are pinions 66, which mesh with the pinion 58 on the generator shaft 53.

Thus it will be seen that when the unwinding spring rotates the casing 41, the pinions 65 are rotated for rotating the pinions 66, the pinion 58 and the generator shaft. The spring is normally held against unwinding and the shaft 53 is normally held against rotation by the following means:

Slidably mounted in the hub 27 is a pin 68 having on its upper end a head 69. On the lower end of the pin 68 is a shoe 70 on which is a facing 71 of felt or other suitable material. A spring 72 is mounted on the pin 68 between the shoulder 67$^a$ and the shoe 70 for normally holding the shoe pressed against the disc 57 and preventing rotation thereof.

Mounted in the wall of the casing 10 as shown in Figure 2 is a slidable pin 73 having a head 74 on its outer end and a head 75 on its inner end. Packing 76 is arranged around the pin 73 to make a tight joint between said pin and the casing 10.

On the hub 27 are lugs 67 which support a pin 77 on which is pivoted a lever 78, one end of which is below the pin 73 and the other end of which is arranged under the head 69 of the pin 68, so that when the pin 73 is depressed, the pin 68 will be raised for compressing the spring 72 and preventing it from holding the shoe 70 against the disc 57.

Slidably mounted on the casing 10 within the guides 80 is a keeper device 81 having an inclined portion 82 provided with an elongated slot 83 through which the pin 73 projects. A pin 84 extends through the pin 73 just below the inclined portion 72, so that when the member 81 is in one position of its sliding movement, the pin 73 may stand in its uppermost position, whereas when the member 81 is slid to another position of its movement, the pin 73 will be held down for holding the shoe 70 out of engagement with the disc 57.

The generator herein mentioned is of the alternating current type having the coils 85 arranged in the casing 52, the core 86 on the shaft 53 and the permanent magnets 87 mounted in the core.

The coils are connected with each other and are respectively grounded as illustrated at 88 in the diagram in Figure 7 and connected by the wire 89 with the spring contact 90, which engages the contact with the bulb 18. The bulb 18 is grounded on the frame of the device as indicated in the diagram at 91.

In the practical use of my improved spring generator, the cap 45 is rotated for winding up the spring. The pawl and ratchet device prevents unwinding in one direction and the engagement of the shoe 70 spring-pressed against the disc 57 prevents unwinding in the other direction.

The spring having been wound up may be released by pressing the pin 73 inwardly, whereupon the shoe 70 will be released from its engagement with the disc 57 on the generator shaft 53. The spring will then rotate the casing 41 for rotating the internal gear 63 and the small pinions 65.

This will impart rotation to the pinions 66 and the pinion 58 and therethrough to the generator shaft 53. The rotation of the generator shaft causes an induced alternating current to the lamp. This lamp will operate several hours with a full current.

The lamp is built so that it is waterproof and may be used under a great variety of conditions and be made in a great variety of forms.

It is my purpose to cover a spring driven generator of my present application as applied to any use to which it is properly applicable. For example, it could readily be used as an attachment forming part of the equipment of a radio-receiving set. Thus in connection with radio apparatus or in many other places, this spring driven generator may be employed as a substitute for electric batteries, and it is my intention to cover by my claims a generator embodying the idea here disclosed for every use to which it might be put. What I want to cover is the idea of using a spring as the source of energy for a generator to take the place of storage batteries for electric lamps, radios or any other uses for which said idea is applicable.

Some changes may be made in the details of the structure without departing from the real spirit and purpose of my invention, and it is my intention to cover by my claims, any modified forms of structure or use of mechanical equivalents, which may be reasonably included within their scope.

I claim as my invention:

1. In a structure of the class described, an outer casing, a cap rotatably mounted thereon, a pair of inner casings received within the outer casing and fixed against rotation with relation thereto, a hub having flanges forming ends for the respective inner casings, a spring motor mounted in one of the inner casings connected with said cap for being wound thereby, a generator mounted in the other of the inner casings, means for operatively connecting the spring motor with the generator, including a shaft projecting through said hub, and means controllable from outside the outer casing for locking said shaft against rotation.

2. In a structure of the class described, an outer casing, a pair of aligned inner casings fixed therein, a hub interposed between the inner casings having flanges forming the ends of said inner casing, a spring motor shaft mounted in one inner casing, springs secured thereto, a drum rotatably mounted and fixed to said springs, having at one end an internal gear, gears mounted in said hub meshing with said internal gear, a generator in the other inner casing having a shaft projected through said hub, a gear on said shaft meshing with said second described gears, a spring-pressed shoe cooperating with said shaft, and means for rendering said shoe inoperative, said means including a member projected through the outer casing.

ALFRED LEROY FISHER.